(12) United States Patent
Huang et al.

(10) Patent No.: US 9,966,834 B2
(45) Date of Patent: May 8, 2018

(54) POWER SUPPLY PROTECTING APPARATUS

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Sheng-Chung Huang, New Taipei (TW); Lei Yang, Wuhan (CN); Chao Lv, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 343 days.

(21) Appl. No.: 14/690,067

(22) Filed: Apr. 17, 2015

(65) Prior Publication Data

US 2016/0190909 A1 Jun. 30, 2016

(30) Foreign Application Priority Data

Dec. 27, 2014 (CN) .......................... 2014 1 0825147

(51) Int. Cl.
*H02M 1/32* (2007.01)
(52) U.S. Cl.
CPC .................... *H02M 1/32* (2013.01)
(58) Field of Classification Search
CPC ... H02M 1/32; H02M 2001/0025; G06F 1/26; H02H 3/20; H02H 3/24; H02H 3/087; H02H 7/1213; H03K 17/0822; G05F 1/573

USPC ................. 361/18; 363/21.2, 21.09
See application file for complete search history.

(56) References Cited

U.S. PATENT DOCUMENTS

| | | | | |
|---|---|---|---|---|
| 6,265,970 B1* | 7/2001 | Whitehead | ......... | G08B 13/1645 340/506 |
| 7,495,419 B1* | 2/2009 | Ju | ............... | G05F 1/62 323/225 |
| 2013/0163633 A1* | 6/2013 | Liu | ......... | G01K 15/00 374/1 |
| 2013/0322491 A1* | 12/2013 | Gao | ......... | G01K 7/02 374/179 |

* cited by examiner

*Primary Examiner* — Thienvu Tran
*Assistant Examiner* — Nicolas Bellido
(74) *Attorney, Agent, or Firm* — ScienBiziP, P.C.

(57) ABSTRACT

A power supply protecting apparatus includes a first comparison unit, a second comparison unit, and a switch unit. The first comparison unit receives an input voltage from an electronic device, compares the input voltage with a first DC voltage, and outputs a first control signal. The second comparison unit receives an output voltage from an electronic device, compares the output voltage with the first DC voltage, and outputs a second control signal. The switch unit receives the first control signal and the second control signal, and outputs a first voltage level reference voltage when receiving a first voltage level first control signal from the first comparison unit or a second voltage level second control signal from the second comparison unit. A reference terminal of the electronic device receives the first voltage level reference voltage, and the electronic device stops working when receiving the first voltage level reference voltage.

16 Claims, 2 Drawing Sheets

US 9,966,834 B2

POWER SUPPLY PROTECTING APPARATUS

CROSS-REFERENCE TO RELATED APPLICATIONS

This application claims priority to Chinese Patent Application No. 201410825147.4 filed on Dec. 27, 2014, the contents of which are incorporated by reference herein in its entirety.

FIELD

The subject matter herein generally relates to a power supply protecting apparatus.

BACKGROUND

Printed circuit boards (PCBs) usually have power supply circuits which provide power supply for electronic components. The power supply circuit includes a voltage regulator and a number of metal-oxide-semiconductor field-effect transistors (MOSFETs). The voltage regulator alternately turns on and turns off the MOSFETs and outputs different working voltages to the corresponding electronic components. If the power supply circuit does not have protection capability when the working voltage is over voltage or under voltage, the MOSFETs tend to be destroyed.

BRIEF DESCRIPTION OF THE DRAWINGS

Implementations of the present technology will now be described, by way of example only, with reference to the attached figures.

DETAILED DESCRIPTION

Figure 1:
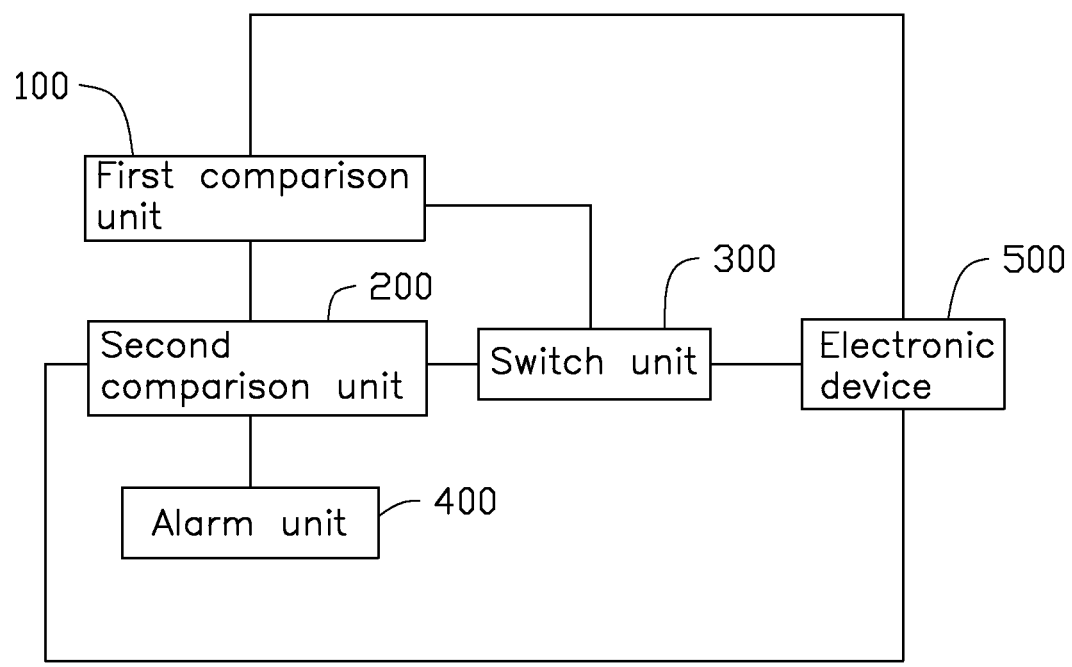
FIG. 1 is a block diagram of an embodiment of a power supply protecting apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like. "Unit" means a collection of electronic hardware alone or in combination with software configured for a particular task or function, although units may overlap or share components.

FIG. 1 illustrates a power supply protecting apparatus in accordance with an embodiment. The power supply protecting apparatus includes a first comparison unit 100, a second comparison unit 200, a switch unit 300, and an alarm unit 400. The first comparison unit 100 and the second comparison unit 200 are configured to detect an input voltage and an output voltage of an electronic device 500 respectively.

Figure 2:
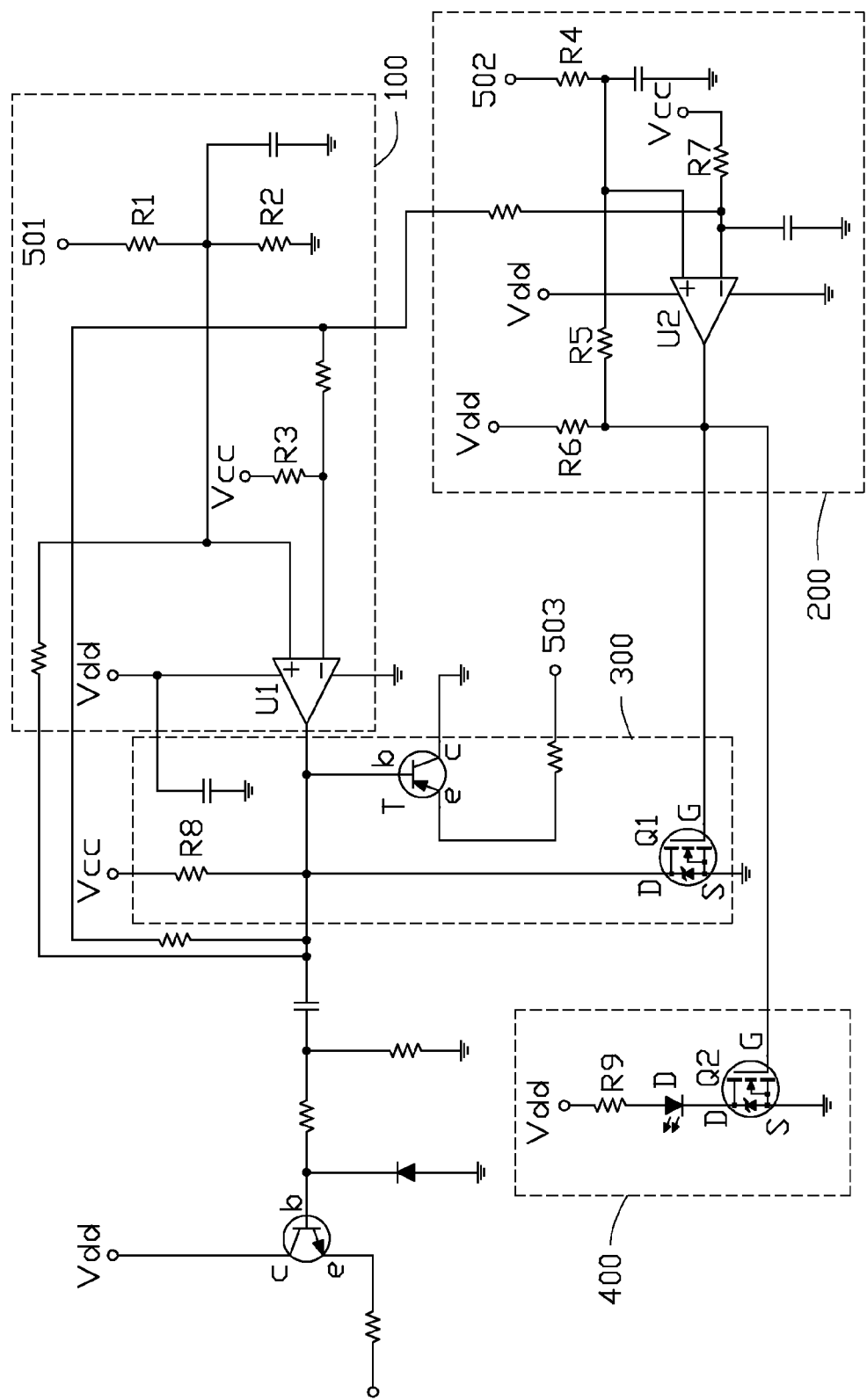
FIG. 2 is a circuit diagram of the power supply protecting apparatus of FIG. 1.

FIG. 2 illustrates that the first comparison unit 100 includes a first comparator U1, a first resistor R1, a second resistor R2, and a third resistor R3. The first comparator U1 includes a non-inverting input terminal; an inverting input terminal, and an output terminal.

The non-inverting input terminal of the first comparator U1 is electrically coupled to a voltage input terminal 501 of the electronic device 500 via the first resistor R1. The non-inverting input terminal of the first comparator U1 is grounded via the second resistor R2. The inverting input terminal of the first comparator U1 is configured to receive a first direct current (DC) voltage Vcc via the third resistor R3. The output terminal of the first comparator U1 is configured to output a first control signal to the switch unit 300.

In at least one embodiment, a resistance of the first resistor R1 is substantially equal to a resistance of the second resistor R2, and the first DC voltage Vcc is a +5 volts auxiliary voltage.

The second comparison unit 200 includes a second comparator U2, a fourth resistor R4, a fifth resistor R5, a sixth resistor R6, and a seventh resistor R7. The second comparator U2 includes a non-inverting input terminal, an inverting input terminal, and an output terminal.

The non-inverting input terminal of the second comparator U2 is electrically coupled to a voltage output terminal 502 of the electronic device 500 via the fourth resistor R4. The non-inverting input terminal of the second comparator U2 is electrically coupled to the output terminal of the second comparator U2 via the fifth resistor R5. A connection point between the output terminal of the second comparator U2 and the fifth resistor R5 is configured to receive a second DC voltage Vdd via the sixth resistor R6. The inverting input terminal of the second comparator U2 is configured to receive the first DC voltage Vcc via the seventh resistor R7. The output terminal of the second comparator U2 is configured to output a second control signal to the switch unit 300 and the alarm unit 400.

In at least one embodiment, a resistance of the fourth resistor R4 is 56 kilo-ohm, a resistance of the fifth resistor R5 is 11 kilo-ohm, and the second DC voltage Vdd is +12V.

The switch unit 300 includes a first switch T, a second switch Q1, and an eighth resistor R8. Each of the first switch T and the second switch Q1 includes a first terminal, a second terminal, and a third terminal.

The first terminal of the first switch T is electrically coupled to the output terminal of the first comparator U1 for receiving the first control signal. The second terminal of the first switch T is electrically coupled to a reference terminal 503 of the electronic device 500 for outputting a reference voltage. The third terminal of the first switch T is grounded. The first terminal of the second switch Q1 is electrically coupled to the output terminal of the second comparator U2 for receiving the second control signal. The second terminal of the second switch Q1 is grounded. The third terminal of the second switch Q1 is electrically coupled to the output terminal of the first comparator U1. The third terminal of the second switch Q1 is configured to receive the first DC voltage Vcc via the eighth resistor R8.

In at least one embodiment, the first switch T is a PNP type transistor. The first terminal, the second terminal, and the third terminal of the first switch T are base, emitter, and collector respectively. The second switch Q1 is an n-channel metal-oxide-semiconductor field-effect transistor (MOSFET). The first terminal, the second terminal, and the third terminal of the second switch Q1 are gate, source, and drain respectively.

The alarm unit 400 includes a third switch Q2, a lighting emitting diode (LED) D, and a ninth resistor R9. The third switch Q2 includes a first terminal, a second terminal, and a third terminal. The first terminal of the third switch Q2 is electrically coupled to the output terminal of the second comparator U2 for receiving the second control signal. The second terminal of the third switch Q2 is grounded. The third terminal of the third switch Q2 is electrically coupled to a cathode of the LED D. An anode of the LED D is configured to receive the second DC voltage Vdd via the ninth resistor R9. In at least one embodiment, the third switch Q2 is an n-channel MOSFET. The first terminal, the second terminal, and the third terminal of the third switch Q2 are gate, source, and drain respectively.

In use, when the input voltage received by the voltage input terminal 501 of the electronic device 500 is greater than +11 volts, the input voltage greater than +11 volts is divided by the first resistor R1 and the second resistor R2 into a DC voltage which is greater than +5 volts. The DC voltage greater than +5 volts is provided to the non-inverting input terminal of the first comparator U1. A voltage level of the non-inverting input terminal of the first comparator U1 is greater than a voltage level of the inverting input terminal of the first comparator U1. The output terminal of the first comparator U1 outputs a high voltage level first control signal to the first terminal of the first switch T. The first switch T turns off. The reference terminal 503 of the electronic device 500 receives the reference voltage normally and the electronic device 500 is in a working state.

When the input voltage received by the voltage input terminal 501 of the electronic device 500 is less than +10 volts, the input voltage less than +10 volts is divided by the first resistor R1 and the second resistor R2 into a DC voltage which is less than +5 volts. The DC voltage less than +5 volts is provided to the non-inverting input terminal of the first comparator U1. A voltage level of the non-inverting input terminal of the first comparator U1 is less than a voltage level of the inverting input terminal of the first comparator U1. The output terminal of the first comparator U1 outputs a low voltage level first control signal to the first terminal of the first switch T. The first switch T turns on. The reference terminal 503 of the electronic device 500 receives a low voltage level reference voltage. The electronic device 500 stops working.

When the output voltage output by the voltage output terminal 502 of the electronic device 500 is less than +30 volts, the output voltage less than +30 volts is divided by the fourth resistor R4 and the fifth resistor R5 into a DC voltage which is less than +5 volts. The DC voltage less than +5 volts is provided to the non-inverting input terminal of the second comparator U2. A voltage level of the non-inverting input terminal of the second comparator U2 is less than a voltage level of the inverting input terminal of the second comparator U2. The output terminal of the second comparator U2 outputs a low voltage level second control signal to the first terminal of the second switch Q1. The second switch Q1 turns off. The first terminal of the first switch T receives the second DC voltage Vdd via the eighth resistor R8. The first switch T turns off. The reference terminal 503 of the electronic device 500 receives the reference voltage normally. The electronic device 500 is in the working state.

When the output voltage output by the voltage output terminal 502 of the electronic device 500 is greater than +30 volts, the output voltage greater than +30 volts is divided by the fourth resistor R4 and the fifth resistor R5 into a DC voltage which is greater than +5 volts. The DC voltage greater than +5 volts is provided to the non-inverting input terminal of the second comparator U2. A voltage level of the non-inverting input terminal of the second comparator U2 is greater than a voltage level of the inverting input terminal of the second comparator U2. The output terminal of the second comparator U2 outputs a high voltage level second control signal to the first terminal of the second switch Q1 and the first terminal of the third switch Q2. The second switch Q1 turns on. The first terminal of the first switch T is grounded via the second switch Q1. The first switch T turns on. The reference terminal 503 of the electronic device 500 receives the low voltage level reference voltage. The electronic device 500 stops working. The third switch Q2 turns on. The LED D is power on and emits light to remind the user.

The embodiments shown and described above are only examples. Many details are often found in the art such as the other features of a power supply protecting apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A power supply protecting apparatus for an electronic device comprising:
   a first comparison unit electrically coupled to a voltage input terminal of the electronic device for receiving an input voltage; the first comparison unit compares the input voltage with a first direct current (DC) voltage and outputs a first control signal;
   a second comparison unit electrically coupled to a voltage output terminal of the electronic device for receiving an output voltage; the second comparison unit compares the output voltage with the first DC voltage and outputs a second control signal; and
   a switch unit configured to receive the first control signal and the second control signal, and output a first voltage level reference voltage when the switch unit receives a first voltage level first control signal from the first comparison unit or a second voltage level second control signal from the second comparison unit;
   wherein a reference terminal of the electronic device is configured to receive the first voltage level reference voltage; and the electronic device stops working when the electronic device receives the first voltage level reference voltage; and
   the first comparison unit comprises a first comparator, a first resistor, and a second resistor; the first comparator comprises a non-inverting input terminal, an inverting input terminal, and an output terminal; the non-inverting input terminal of the first comparator is electrically coupled to the voltage input terminal of the electronic device via the first resistor; the non-inverting input terminal of the first comparator is grounded via the second resistor; the inverting input terminal of the first comparator is configured to receive the first DC voltage; and the output terminal of the first comparator is configured to output the first control signal.

2. The power supply protecting apparatus of claim 1, wherein a resistance of the first resistor is substantially equal to a resistance of the second resistor; and the first DC voltage is a +5 volts auxiliary voltage.

3. The power supply protecting apparatus of claim 1, wherein the second comparison unit comprises a second comparator, a fourth resistor, and a fifth resistor; the second comparator comprises a non-inverting input terminal, an inverting input terminal, and an output terminal; the non-inverting input terminal of the second comparator is electrically coupled to the voltage output terminal of the electronic device via the fourth resistor; the non-inverting input terminal of the second comparator is electrically coupled to the output terminal of the second comparator via the fifth resistor; the inverting input terminal of the second comparator is configured to receive the first DC voltage; and the output terminal of the second comparator is configured to output the second control signal.

4. The power supply protecting apparatus of claim 3, wherein a resistance of the fourth resistor is 56 kilo-ohm; and a resistance of the fifth resistor is 11 kilo-ohm.

5. The power supply protecting apparatus of claim 3, wherein the switch unit comprises a first switch, a second switch, and an eighth resistor; each of the first switch and the second switch comprises a first terminal, a second terminal, and a third terminal; the first terminal of the first switch is electrically coupled to the output terminal of the first comparator for receiving the first control signal; the second terminal of the first switch is electrically coupled to the reference terminal of the electronic device for outputting the reference voltage; the third terminal of the first switch is grounded; the first terminal of the second switch is electrically coupled to the output terminal of the second comparator for receiving the second control signal; the second terminal of the second switch is grounded; the third terminal of the second switch is electrically coupled to the output terminal of the first comparator; and the third terminal of the second switch is configured to receive the first DC voltage via the eighth resistor.

6. The power supply protecting apparatus of claim 5, wherein the first switch is a PNP type transistor; the first terminal, the second terminal, and the third terminal of the first switch are base, emitter, and collector respectively; the second switch is an n-channel metal-oxide-semiconductor field-effect transistor (MOSFET); and the first terminal, the second terminal, and the third terminal of the second switch are gate, source, and drain respectively.

7. The power supply protecting apparatus of claim 3, further comprising an alarm unit configured to receive the second control signal; and the alarm unit is configured to alarm when the alarm unit receives the second voltage level second control signal.

8. The power supply protecting apparatus of claim 7, wherein the alarm unit comprises a third switch and a lighting emitting diode (LED); the third switch comprises a first terminal, a second terminal, and a third terminal; the first terminal of the third switch is electrically coupled to the output terminal of the second comparator for receiving the second control signal; the second terminal of the third switch is grounded; the third terminal of the third switch is electrically coupled to a cathode of the LED; and an anode of the LED is configured to receive a second DC voltage.

9. A power supply protecting apparatus for an electronic device comprising:
a first comparison unit electrically coupled to a voltage input terminal of the electronic device for receiving an input voltage; the first comparison unit compares the input voltage with a first direct current (DC) voltage and outputs a first control signal;
a second comparison unit electrically coupled to a voltage output terminal of the electronic device for receiving an output voltage; the second comparison unit compares the output voltage with the first DC voltage and outputs a second control signal;
a switch unit configured to receive the first control signal and the second control signal, and output a first voltage level reference voltage when the switch unit receives a first voltage level first control signal from the first comparison unit or a second voltage level second control signal from the second comparison unit; and
an alarm unit configured to receive the second control signal, and activate the alarm unit when the alarm unit receives the second voltage level second control signal;
wherein a reference terminal of the electronic device is configured to receive the first voltage level reference voltage; and the electronic device stops working when the electronic device receives the first voltage level reference voltage; and
the first comparison unit comprises a first comparator, a first resistor, and a second resistor; the first comparator comprises a non-inverting input terminal, an inverting input terminal, and an output terminal; the non-inverting input terminal of the first comparator is electrically coupled to the voltage input terminal of the electronic device via the first resistor; the non-inverting input terminal of the first comparator is grounded via the second resistor; the inverting input terminal of the first comparator is configured to receive the first DC voltage; and the output terminal of the first comparator is configured to output the first control signal.

10. The power supply protecting apparatus of claim 9, wherein a resistance of the first resistor is substantially equal to a resistance of the second resistor; and the first DC voltage is a +5 volts auxiliary voltage.

11. The power supply protecting apparatus of claim 9, wherein the second comparison unit comprises a second comparator, a fourth resistor, and a fifth resistor; the second comparator comprises a non-inverting input terminal, an inverting input terminal, and an output terminal; the non-inverting input terminal of the second comparator is electrically coupled to the voltage output terminal of the electronic device via the fourth resistor; the non-inverting input terminal of the second comparator is electrically coupled to the output terminal of the second comparator via the fifth resistor; the inverting input terminal of the second comparator is configured to receive the first DC voltage; and the output terminal of the second comparator is configured to output the second control signal.

12. The power supply protecting apparatus of claim 11, wherein a resistance of the fourth resistor is 56 kilo-ohm; and a resistance of the fifth resistor is 11 kilo-ohm.

13. The power supply protecting apparatus of claim 11, wherein the switch unit comprises a first switch, a second switch, and an eighth resistor; each of the first switch and the second switch comprises a first terminal, a second terminal, and a third terminal; the first terminal of the first switch is electrically coupled to the output terminal of the first comparator for receiving the first control signal; the second terminal of the first switch is electrically coupled to the reference terminal of the electronic device for outputting the reference voltage; the third terminal of the first switch is grounded; the first terminal of the second switch is electrically coupled to the output terminal of the second comparator for receiving the second control signal; the second terminal of the second switch is grounded; the third terminal of the second switch is electrically coupled to the output terminal of the first comparator; and the third terminal of the second switch is configured to receive the first DC voltage via the eighth resistor.

14. The power supply protecting apparatus of claim 13, wherein the first switch is a PNP type transistor; the first terminal, the second terminal, and the third terminal of the first switch are base, emitter, and collector respectively; the second switch is an n-channel metal-oxide-semiconductor field-effect transistor (MOSFET); and the first terminal, the second terminal, and the third terminal of the second switch are gate, source, and drain respectively.

15. The power supply protecting apparatus of claim 11, wherein the alarm unit comprises a third switch and a lighting emitting diode (LED); the third switch comprises a first terminal, a second terminal, and a third terminal; the first terminal of the third switch is electrically coupled to the output terminal of the second comparator for receiving the second control signal; the second terminal of the third switch is grounded; the third terminal of the third switch is electrically coupled to a cathode of the LED; and an anode of the LED is configured to receive a second DC voltage.

16. A power supply protecting apparatus for an electronic device comprising:
   a first comparison circuit electrically coupled to a first voltage terminal of the electronic device and being configured to compare a voltage of the first voltage terminal with a first reference voltage and to output a corresponding first control signal;
   a second comparison circuit electrically coupled to a second voltage terminal of the electronic device and being configured to compare a voltage of the second voltage terminal with the first reference voltage and to output a corresponding second control signal;
   a switch unit being configured to:
   receive the first control signal and the second control signal;
   output a first voltage level reference voltage in response to a first value of the first control signal;
   output the first voltage level reference voltage in response to a first value of the second control signal; and
   an alarm circuit configured to receive the second control signal, and activate the alarm circuit when the alarm unit receives a second voltage level second control signal;
   wherein a reference terminal of the electronic device is configured to receive the first voltage level reference voltage as an OFF command;
   the first comparison circuit comprises a first comparator, a first resistor, and a second resistor; the first comparator comprises a non-inverting input terminal, an inverting input terminal, and an output terminal; the non-inverting input terminal of the first comparator is electrically coupled to the voltage input terminal of the electronic device via the first resistor; the non-inverting input terminal of the first comparator is grounded via the second resistor; the inverting input terminal of the first comparator is configured to receive the first DC voltage; and the output terminal of the first comparator is configured to output the first control signal; and
   the second comparison circuit comprises a second comparator, a fourth resistor, and a fifth resistor; the second comparator comprises a non-inverting input terminal, an inverting input terminal, and an output terminal; the non-inverting input terminal of the second comparator is electrically coupled to the voltage output terminal of the electronic device via the fourth resistor; the non-inverting input terminal of the second comparator is electrically coupled to the output terminal of the second comparator via the fifth resistor; the inverting input terminal of the second comparator is configured to receive the first DC voltage; and the output terminal of the second comparator is configured to output the second control signal.

* * * * *